Figure 1:
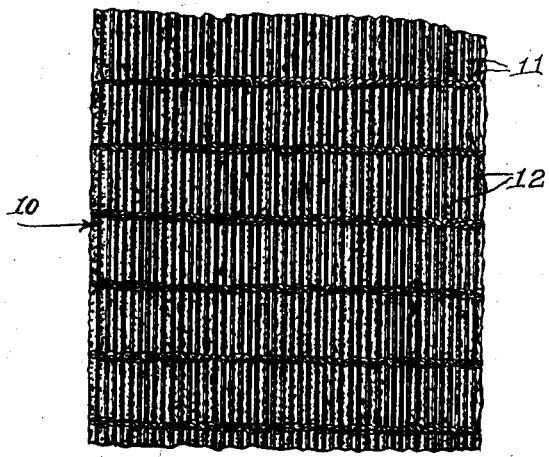

June 2, 1931.  W. J. SCHOONMAKER  1,808,078

NONINFLAMMABLE SOUND PICTURE SCREEN

Filed Nov. 12, 1929

INVENTOR
William J. Schoonmaker

BY ATTORNEY

Patented June 2, 1931

1,808,078

UNITED STATES PATENT OFFICE

WILLIAM J. SCHOONMAKER, OF NEW YORK, N. Y.

NONINFLAMMABLE SOUND PICTURE SCREEN

Application filed November 12, 1929. Serial No. 406,559.

This invention relates to new and useful improvements in sound picture screens of the class adapted for the reproduction of talking pictures, and it has been a special object of this device to incorporate in this connection as an outstanding and very important feature, the great advantage of non-inflammability.

A further object of this device has been to construct and build a sound picture screen wherein the numerous defects hitherto found and obstacles met have been eliminated, and wherein the cooperation of a picture display with the reproduction of sound has attained the desired state of perfection.

Hitherto the screens employed on the moving picture stage, until the introduction of the so called talking films, were made with one object in mind, that is, to yield the most effective reflection according to the individual surroundings.

However, as the science relative to sounds has reached a stage, where the phonetics may be controlled and in a certain sense embodied and made to cooperate with a film display, it has become incumbent to devise a medium in the form of a screen which would offer suitable conditions to the passage of sounds and at the same time avoid impairing the reflection of light thrown upon the screen for the display of a talking picture.

Furthermore recent occurrences and unfortunate incidents due to fires, caused directly and indirectly by the use and storage of inflammable films, have aroused public sentiment and the authorities to such a degree, that an uncompromising demand has been made that every effort and endeavor be bent upon solving the problem of providing a non-inflammable sound picture screen that would be flameproof and safe to all intents and purposes under any circumstances.

The objects above stated have been kept in view in the construction of this device, as the latter presents a perfect reflective surface with a minimum of resistance to the passage of sound. At the same time it has further been possible through extensive research work and experiments to make the said screen not only non-inflammable and flameproof but impervious to any evaporation or deterioration due to exposure to the air or contact with water.

The device, as will be hereinafter further described consists of a woven material in which through a specifically designed pattern of weaving an immense number of very fine interstices exist among the threads and in addition to the latter the said material has also been provided with larger air spaces woven among the threads. By thus employing a special pattern or design in the weaving of the material, as will be clearly seen from the accompanying drawings, a surface has been created in addition to the features formerly stated, for which the threads have been arranged in such a manner as to form tiny ridges and cross ridges upon the surface of the said material, thereby contributing to the perfection of the latter in regard to the problem of reflection, as the light projected upon a surface as thus described will be diffused and thus reflected evenly with no shadows or high lights as arise when light is reflected from a polished or non-diffusive surface, when viewed from different angles.

While the said material thus offers a medium for comparatively unrestricted transmission of sound and perfect reflection, the non-inflammable characteristics are imparted to the screen in the following manner. The material or fabric is first treated with a fire proofing solution to the extent of permeating and making it non-inflammable, after which a plastic non-inflammable and waterproof chemical compound is applied to the said material or fabric on both sides. Thus, in addition to being non-inflammable and waterproof in itself, this plastic chemical compound serves as a seal to protect the ingredients of the fireproofing solution formerly applied to the fabric from evaporation upon contact with air or deteriorating or dissolving into solution when exposed to water. Incidentally, as the plastic non-inflammable chemical compound is waterproof, the said screen may be conveniently cleaned while remaining on the frame.

With the advantages thus added to the said screen material through the application of said plastic non-inflammable and waterproof chemical compound, it must be pointed out in this connection that the composition of the said plastic chemical compound has been tempered in density to the effect, that the latter, when applied to the woven screen cloth, will not clog up the air spaces, or entirely close the interstices among the threads, but only further the objects formerly stated.

As a modification of my device, the said cloth may be made without any air spaces woven therein, except for the interstices that naturally would exist among the threads. In this case the air spaces may be arranged in the said material, subsequent to the aforesaid treatment by the plastic non-inflammable and waterproof chemical compound in any suitable manner, as for instance by a stamping process.

As the construction of this device, as described, is rather simple the cost of manufacturing the same should be comparatively low.

With the above and other objects in view, this invention consists of the novel features of construction, combination and arrangements of parts, hereinafter fully described, claimed and illustrated in the accompanying drawings forming part of this specification, and in which similar characters of reference indicate corresponding parts in all views, and in which:

Figure 1 is a plan view of a portion of a screen cloth embodying my invention, and showing the said cloth formed with interstices among the threads for the passage of sound and with a plastic non-inflammable and waterproof chemical compound applied thereto, subsequent to the treatment of the said material by a fireproofing solution, the said plastic compound being of a sufficient thinness in density as not to completely close up the said interstices, thus allowing transmission of sound through the latter.

Figure 2:
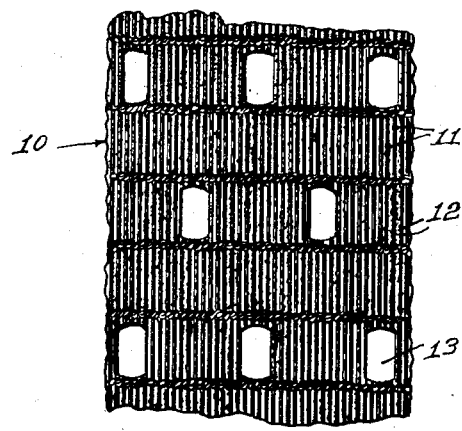

Figure 2 is a view similar to Figure 1, but with air spaces especially woven in the cloth as a further means, in addition to the interstices among the threads, for facilitating the passage of sound through the cloth, and with a plastic non-inflammable and waterproof chemical compound applied to the said cloth, subsequent to a treatment of the latter by a fireproofing solution, the said plastic compound being of a sufficient thinness in density as not to completely close up the said interstices, thus allowing transmission of sound through the latter and also through the air spaces.

Figure 3:
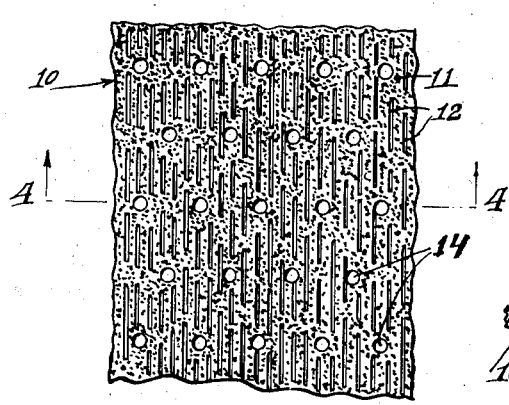

Figure 3 shows a modified form of my device, wherein the cloth has been made with the usual interstices among the threads to facilitate the passage of sound through the cloth, and with a plastic non-inflammable and washable chemical compound applied to the said cloth, subsequent to the treatment of the latter by a fireproofing solution, in such a manner that the said interstices among the threads will not be entirely closed up by the said plastic compound, and in addition, to further facilitate the passage of sound through the said screen the latter has, after the application of the said plastic chemical compound thereto, been provided with perforations or air spaces, for instance, by means of a stamping process.

Figure 4:
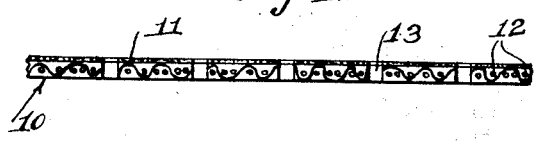

Figure 4 is a transverse sectional view taken on line 4—4 of Figure 3.

Referring more particularly to the drawings, 10 indicates a woven material or fabric, having a plastic chemical compound 11 applied thereto. 12 indicates the interstices among the threads and 13 the woven air spaces, while 14 shows the air spaces, or perforations, arranged in the said material, as for instance, by a stamping process.

The interstices have been closely arranged in the said material, and serve, as shown, especially in Figs. 1, 2 and 4, as a medium for the transmission of sound. In addition larger air spaces have been added in Fig. 2, and perforations in Fig. 3.

In case of the modifications shown in Fig. 3, it is quite evident, that the cloth employed herein may well be made without any of the ridges or cross-ridges formerly referred to.

It is obvious that changes may be made in the form, construction and arrangement as shown, within the scope of the appended claims, without departing from the spirit of the invention, and I do not therefore limit myself to the construction and arrangement shown and described herein.

What I claim as new, and desire to secure by Letters Patent of the United States, is:

Claims:

1. A non-inflammable sound picture screen comprising a woven fabric formed with interstices in the weaving among the threads, the said fabric being submitted to a fireproof solution treatment and having afterwards applied to both sides a plastic non-inflammable and waterproof chemical compound, said plastic compound being of a density suitable for covering the threads of the said fabric, thus acting as a seal in preventing deterioration of the ingredients of the said fireproof solution from exposure to air or contact with water and at the same time making said screen non-inflammable, waterproof and washable, the said plastic compound being of a sufficient thinness in density as not to clog up or entirely close the said interstices thus allowing the passage of sound through said screen by way of the interstices.

2. A non-inflammable sound picture screen comprising a woven fabric formed with interstices and air spaces in the weaving among the threads, the said fabric being submitted to a fireproof solution treatment and having afterwards applied to both sides a plastic non-inflammable and waterproof chemical compound, said plastic compound being of a density suitable for covering the threads of the said fabric, thus acting as a seal in preventing deterioration of the ingredients of the said fireproof solution from exposure to air or contact with water and at the same time making said screen non-inflammable, waterproof and washable, the said plastic compound being of a sufficient thinness in density as not to clog up or entirely close the said interstices and air spaces thus allowing the passage of sound through said screen by way of the interstices and air spaces.

3. A non-inflammable sound picture screen comprising a woven fabric having a ridge-formed surface and being made with interstices in the weaving among the threads, the said fabric being submitted to a fireproof solution treatment and having afterwards applied to both sides a plastic non-inflammable and waterproof chemical compound, said plastic compound being of a density suitable for covering the threads of the said fabric, thus acting as a seal in preventing deterioration of the ingredients of the said fireproof solution from exposure to air or contact with water and at the same time making said screen non-inflammable, waterproof and washable, the said plastic compound being of a sufficient thinness in density as not to clog up or entirely close the said interstices thus allowing the passage of sound through said screen by way of the interstices and at the same time giving by virtue of the ridged surface an evenly diffused reflection to the picture displayed, substantially as shown and described.

4. A non-inflammable sound picture screen comprising a woven fabric having a ridged formed surface and being made with interstices and air spaces in the weaving among the threads, the said fabric being submitted to a fireproof solution treatment and having afterwards applied to both sides a plastic non-inflammable and waterproof chemical compound, said plastic compound being of a density suitable for covering the threads of the said fabric, thus acting as a seal in preventing deterioration of the ingredients of the said fireproof solution from exposure to air or contact with water and at the same time making said screen non-inflammable, waterproof and washable, the said plastic compound being of a sufficient thinness in density as not to clog up or entirely close the said interstices and air spaces thus allowing the passage of sound through said screen by way of the interstices and air spaces and at the same time giving by virtue of the ridged surface an evenly diffused reflection to the picture display substantially as shown and described.

5. A non-inflammable sound picture screen comprising a woven fabric formed with interstices in the weaving among the threads, the said fabric being submitted to a fireproof solution treatment and having afterwards applied to both sides a plastic non-inflammable and waterproof chemical compound, said plastic compound being of a density suitable for covering the threads of the said fabric, thus acting as a seal in preventing deterioration of the ingredients of the said fireproof solution from exposure to air or contact with water and at the same time making said screen non-inflammable, waterproof and washable, the said plastic compound being of a sufficient thinness in density as not to clog up or entirely close the said interstices, the said screen being subsequently provided with air spaces by means of a stamping process thus permitting the passage of sound through the interstices and air spaces.

6. A non-inflammable sound picture screen, comprising a woven fabric having a ridged surface and being made with interstices among the threads and apertures in the weaving, the said interstices being formed in the areas adjacent to the ridges, but outside the latter, the said fabric being submitted to a fireproof solution treatment and having afterwards applied to both sides a plastic non-inflammable and waterproof chemical compound, said plastic compound being of a density suitable for covering the threads of the fabric, thus acting as a seal in preventing deterioration of the ingredients of the said fireproof solution from exposure to air or contact with water, and at the same time making said screen non-inflammable, waterproof and washable, the said plastic compound being of a sufficient thinness in density as not to clog up or entirely close the said interstices and air spaces thus allowing the passage of sound through said screen by way of the interstices and air spaces and at the same time giving by virtue of the ridged surface an evenly diffused reflection to the picture display, substantially as shown and described.

Signed at New York city, in the county of New York and State of New York, this 11th day of November, A. D. 1929.

WILLIAM J. SCHOONMAKER.